United States Patent
Kovach

(10) Patent No.: US 9,791,936 B1
(45) Date of Patent: Oct. 17, 2017

(54) AUDIO AND MOTION-BASED CONTROL OF A PERSONALIZED SMART APPLIANCE, MEDIA, AND METHODS OF USE

(71) Applicant: Aram Kovach, Lewis Center, OH (US)

(72) Inventor: Aram Kovach, Lewis Center, OH (US)

(73) Assignee: Aram Kavach, Lewis Center, OH (US)

( * ) Notice: Subject to any disclaimer, the term of this patent is extended or adjusted under 35 U.S.C. 154(b) by 0 days.

(21) Appl. No.: 15/145,118

(22) Filed: May 3, 2016

(51) Int. Cl.
| | |
|---|---|
| G06F 3/01 | (2006.01) |
| G06F 3/16 | (2006.01) |
| G06T 19/00 | (2011.01) |
| G06F 3/0484 | (2013.01) |
| G06F 3/0482 | (2013.01) |
| G09G 5/12 | (2006.01) |
| G09G 5/377 | (2006.01) |
| F24C 7/08 | (2006.01) |

(52) U.S. Cl.
CPC ............ *G06F 3/017* (2013.01); *F24C 7/082* (2013.01); *F24C 7/087* (2013.01); *G06F 3/0482* (2013.01); *G06F 3/04842* (2013.01); *G06F 3/04847* (2013.01); *G06F 3/167* (2013.01); *G06T 19/006* (2013.01); *G09G 5/12* (2013.01); *G09G 5/377* (2013.01); *G09G 2370/06* (2013.01)

(58) Field of Classification Search
None
See application file for complete search history.

(56) References Cited

U.S. PATENT DOCUMENTS

| 5,611,327 A | * | 3/1997 | Teixeira Filho ........ F24C 3/124 126/39 G |
| 6,191,773 B1 | | 2/2001 | Maruno et al. |
| 2002/0014482 A1 | | 2/2002 | Becker et al. |
| 2005/0105759 A1 | | 5/2005 | Roberts et al. |
| 2007/0211915 A1 | * | 9/2007 | Roberts .................... G06F 3/017 382/100 |
| 2011/0137657 A1 | * | 6/2011 | Cenedese ............ A47L 15/4293 704/275 |
| 2012/0053740 A1 | * | 3/2012 | Venkatakrishnan ... G06Q 50/06 700/291 |
| 2013/0144915 A1 | * | 6/2013 | Ravi .................. G06F 17/30035 707/785 |
| 2013/0229346 A1 | | 9/2013 | Jungbauer et al. |

(Continued)

FOREIGN PATENT DOCUMENTS

| DE | 102012216936 A1 | 10/2013 |
| DE | 102014007173 A1 | 11/2015 |
| EP | 2615376 A1 | 7/2013 |

*Primary Examiner* — Zhengxi Liu
*Assistant Examiner* — Diana Hickey
(74) *Attorney, Agent, or Firm* — Dinsmore & Shohl

(57) ABSTRACT

Methods, systems and media are provided for hands-free operation of an appliance. For example, the appliance may detect input from a hands-free user, where the detected input is voice or gesticular. The appliance may compare the detected input to known inputs and retrieving the user's profile based on the detected input corresponding to a known input. Based upon retrieval of the user's profile, the appliance may output recognition of the user input and modify operation of a burner according to both the user input and the retrieved user profile. Based upon the detected input being unrecognized, the appliance may create a new user profile associated with the detected input and modify operation of a burner according to the detected input.

20 Claims, 5 Drawing Sheets

(56) References Cited

U.S. PATENT DOCUMENTS

2014/0257532 A1\* 9/2014 Kim .................. G05B 15/02
                                                    700/90
2015/0234364 A1\* 8/2015 Gardner ............ G05B 15/02
                                                    700/275

\* cited by examiner

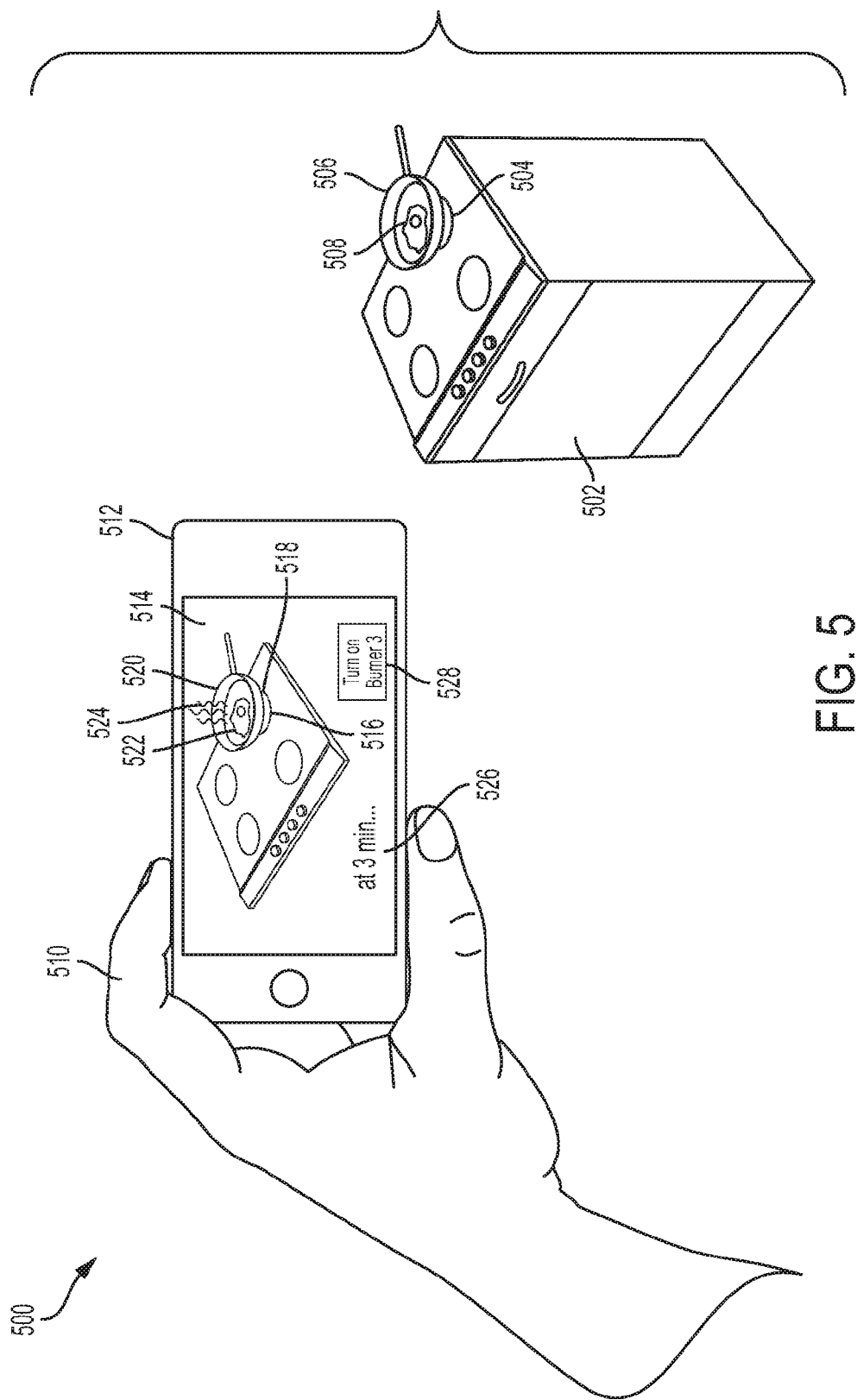

US 9,791,936 B1

AUDIO AND MOTION-BASED CONTROL OF A PERSONALIZED SMART APPLIANCE, MEDIA, AND METHODS OF USE

TECHNICAL FIELD

The present specification generally relates to smart appliances that facilitate user interaction through audio and/or motion input and, more specifically, to smart appliances that are customizable to specific users through repeated interaction, including users that utilize client devices to interact with smart appliances, and media and methods of use for such appliances.

BACKGROUND

Users have traditionally utilized buttons and knobs to control appliances such as stoves. These appliances have not provided for hands-free operation, such as through voice or motion/gesture control. If a user's hand was covered in sauce, for example, the user may have had the choice of either getting sauce on knobs, or else risk burning what is on the stove while taking time to clean their hands. Further, these appliances have not been customizable to specific users.

Accordingly, a need exists for an appliance that provides customizable hands-free operation for specific users, and media and methods of use of such appliances.

SUMMARY

A method for hands-free use of an appliance, comprising detecting input from a hands-free user, the detected input being voice or gesticular. The method further compares the detected input to known inputs and retrieves the user's profile based on the detected input corresponding to a known input. The method also, based upon retrieval of the user's profile, outputs recognition of the user input and modifies operation of a burner according to both the user input and the retrieved user profile. Further still, the method, based upon the detected input being unrecognized, creates a new user profile associated with the detected input and modifying operation of a burner according to the detected input.

In another embodiment, an appliance provides hands-free operation. The appliance comprises a burner, memory, a processor coupled to the memory, and a detection unit. The detection unit is configured to detect input from a hands-free user, with the detected input being voice or gesticular. The detection unit is further configured to retrieve the user's profile based on the detected input corresponding to a known input. The detection unit, based upon retrieval of the user's profile, is also configured to output recognition of the user input and modifies operation of a burner according to both the user input and the retrieved user profile. The detection unit, based upon the detected input being unrecognized, is also configured to create a new user profile associated with the detected input and modify operation of a burner according to the detected input.

In yet another embodiment, a non-transitory computer readable medium embodies computer-executable instructions, that when executed by a processor, cause the processor to detect input from a hands-free user, the detected input being voice or gesticular. The medium also, when executed by a processor, compares the detected input to known inputs and retrieves the user's profile based on the detected input corresponding to a known input. Based upon retrieval of the user's profile, the medium also, when executed by a processor, outputs recognition of the user input and modifies operation of a burner according to both the user input and the retrieved user profile. Based upon the detected input being unrecognized, the medium further still, when executed by a processor, creates a new user profile associated with the detected input and modifies operation of a burner according to the detected input.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5 schematically illustrates appliance control and simulation in augmented reality via smartphone, according to one or more embodiments shown and described herein.

DETAILED DESCRIPTION

Figure 1:
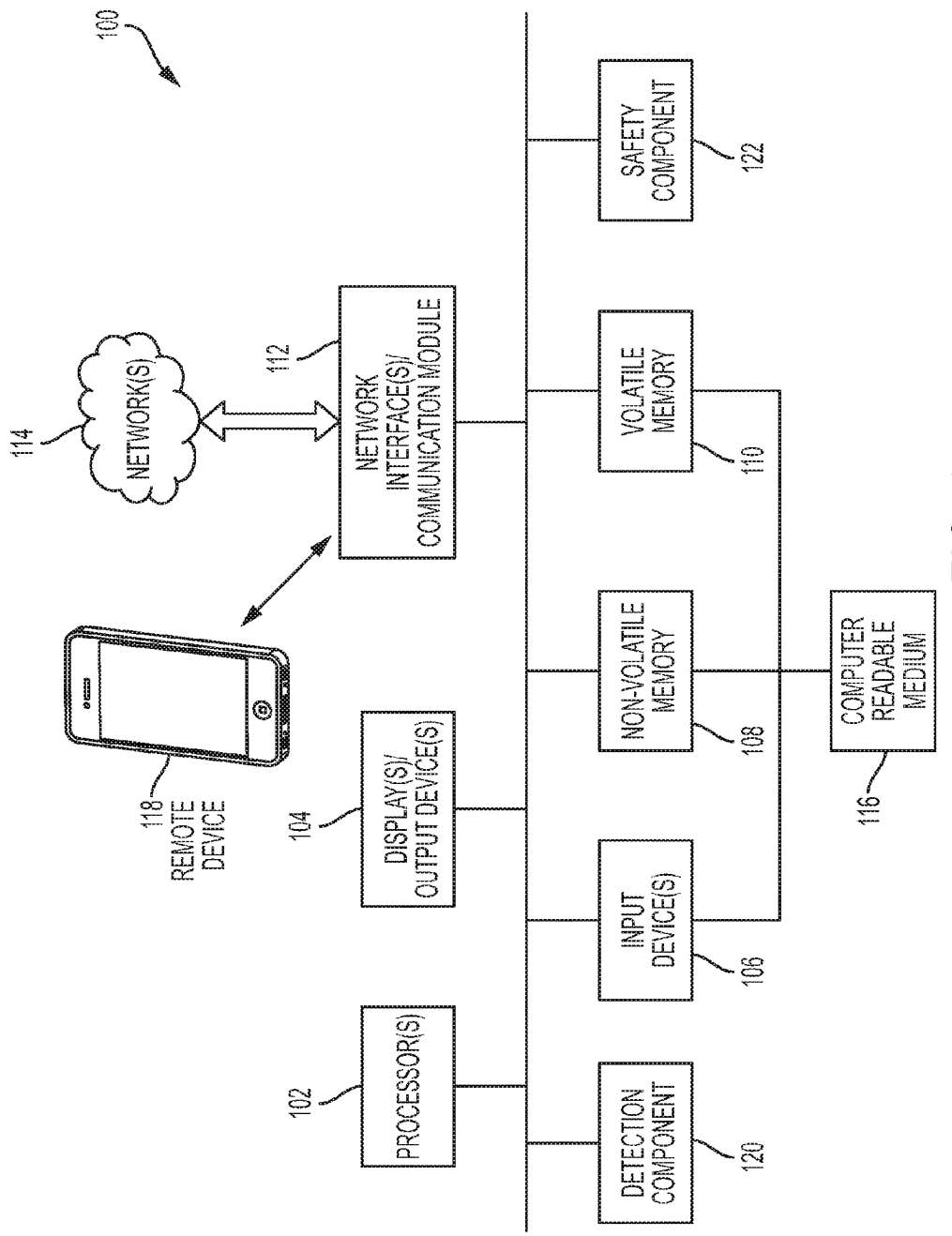
FIG. 1 is a block diagram of an appliance and associated sub-components, according to one or more embodiments shown and described herein.

Referring generally to the figures, embodiments of the present disclosure are directed to hands-free customizable operation of an appliance. Some embodiments provide for overlaying, on a device controlled by the user, augmented-reality content specific to the appliance the current operating condition of the appliance, the user, and the location and orientation of the user relative to the appliance. Other embodiments provide for receiving at the appliance, from a monitoring device worn by the user, monitoring data specific to the user, modifying operation of the appliance based upon both the monitoring data and data detected by the appliance, and providing output to the user indicating the modified operation of the appliance. Still other embodiments provide for aggregating data based upon inputs received from a plurality of users, modifying operation of the appliance based upon the aggregated data, aggregating new data received in response to the modified operation of the appliance, and further modifying operation of the appliance based upon the new data. Embodiments also provide for a gesture including one or more hand movements comprising selecting a burner from among a plurality of burners based upon a detected number of extended fingers from the user, modifying burner temperature based upon detecting a hand-lowering or hand-raising gesture from the user, and activating or deactivating a burner based upon a detected hand rotation from the user. Various embodiments provide for receiving storage data from a food storage device regarding edible contents of the food storage device, and providing output to the user based upon the storage data. Some embodiments also provide for obtaining weight data of food on the burner, outputting a plurality of options based upon a plurality of calculations and the weight data, and receiving a response from the user indicating a choice of one of the options.

Some embodiments provide for a display device configured to provide visual output in response to a detected input. Embodiments further provide for a safety component configured to notify the user that the burner is above a threshold temperature, and to turn off the burner in response to a two-handed gesture. Various embodiments disclose that the safety component is configured to receive notification from a client device that an infrared sensor on the client device has detected smoke particles above the burner and to turn off the burner in response to the received notification from the client device. Other embodiments describe a communication component configured to modify operation of the burner based upon data received from an augmented reality device being used by the user, wherein the received data is based upon input provided by the user to the augmented reality device. Some embodiments also disclose that the communication module is configured to aggregate data based upon inputs received from at least one user, to send the aggregated data to a remote device, to receive, from the remote device, usage data corresponding to other users, and to modify operation of the appliance based upon the compiled data. Still other embodiments disclose that the detection component is further configured to identify a user or a gesticular command based upon detecting movement of a limb comprising less than five digits.

Various embodiments provide for visually identifying the user. Some embodiments disclose receiving input from the user and other individuals, and only responding to input from the user. Other embodiments receive user-specified overlay data at a user device, the user-specified overlay data being associated with the user's profile, transmit cooking instruction data to the user device, and generate an augmented reality display on the user device utilizing the user-specified data, the transmitted data, a camera, and a display. Still other embodiments provide a spoken response to a user. More embodiments create an anonymized profile for a user and for subsequently recognizing the user and updating the anonymous profile though continued interaction.

Referring now to the drawings, FIG. 1 illustrates an exemplary appliance 100, through which embodiments of the disclosure can be implemented. The appliance 100 described herein is but one example of a suitable appliance and does not suggest any limitation on the scope of any embodiments presented. Nothing illustrated or described with respect to the appliance 100 should be interpreted as being required or as creating any type of dependency with respect to any element or plurality of elements. In various embodiments, an appliance 100 may include, but need not be limited to, a stove, oven, refrigerator, toaster, microwave, freezer, or any other type of device that interacts with food in any way. In an embodiment, the appliance 100 includes at least one processor 102 and memory (non-volatile memory 108 and/or volatile memory 110). The appliance 100 can include one or more displays and/or output devices 104 such as monitors, speakers, headphones, projectors, wearable-displays, holographic displays, and/or printers, for example. The appliance 100 may further include one or more input devices 106 which can include, by way of example, any type of mouse, keyboard, disk/media drive, memory stick/thumb-drive, memory card, pen, touch-input device, biometric scanner, voice/auditory input device, motion-detector, camera, scale, etc.

The appliance 100 typically includes non-volatile memory 108 (ROM, flash memory, etc.), volatile memory 110 (RAM, etc.), or a combination thereof. A network interface 112 can facilitate communications over a network 114 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 112 can be communicatively coupled to any device capable of transmitting and/or receiving data via the network 114. Accordingly, the network interface hardware 112 can include a communication transceiver for sending and/or receiving any wired or wireless communication. For example, the network interface hardware 112 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 112 includes hardware configured to operate in accordance with the Bluetooth wireless communication protocol. In another embodiment, network interface hardware 150 may include a Bluetooth send/receive module for sending and receiving Bluetooth communications to/from the at least one mobile device 118.

A computer-readable medium 116 may comprise a plurality of computer readable mediums, each of which may be either a computer readable storage medium or a computer readable signal medium. A computer readable storage medium 116 may reside, for example, within an input device 106, non-volatile memory 108, volatile memory 110, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave.

The appliance 100 may include one or more network interfaces 112 to facilitate communication with one or more remote devices 118, which may include, for example, client and/or server devices. A network interface 112 may also be described as a communications module, as these terms may be used interchangeably. As described in more detail below, remote devices 118 may include, for example, smartphones, tablets, laptops, netbooks, desktops, augmented-reality glasses or other head-worn devices, PDA, or any other computing device. The appliance 100 may further include one or more detection component(s) 120. In some embodiments, detection component 120 may weigh objects (such as food placed upon a stove) where the input device senses weight (such as with a scale). Detection component 120 is described below in more detail. Additionally, the appliance 100 may further include one or more safety components 122 described below in more detail.

Figure 2:
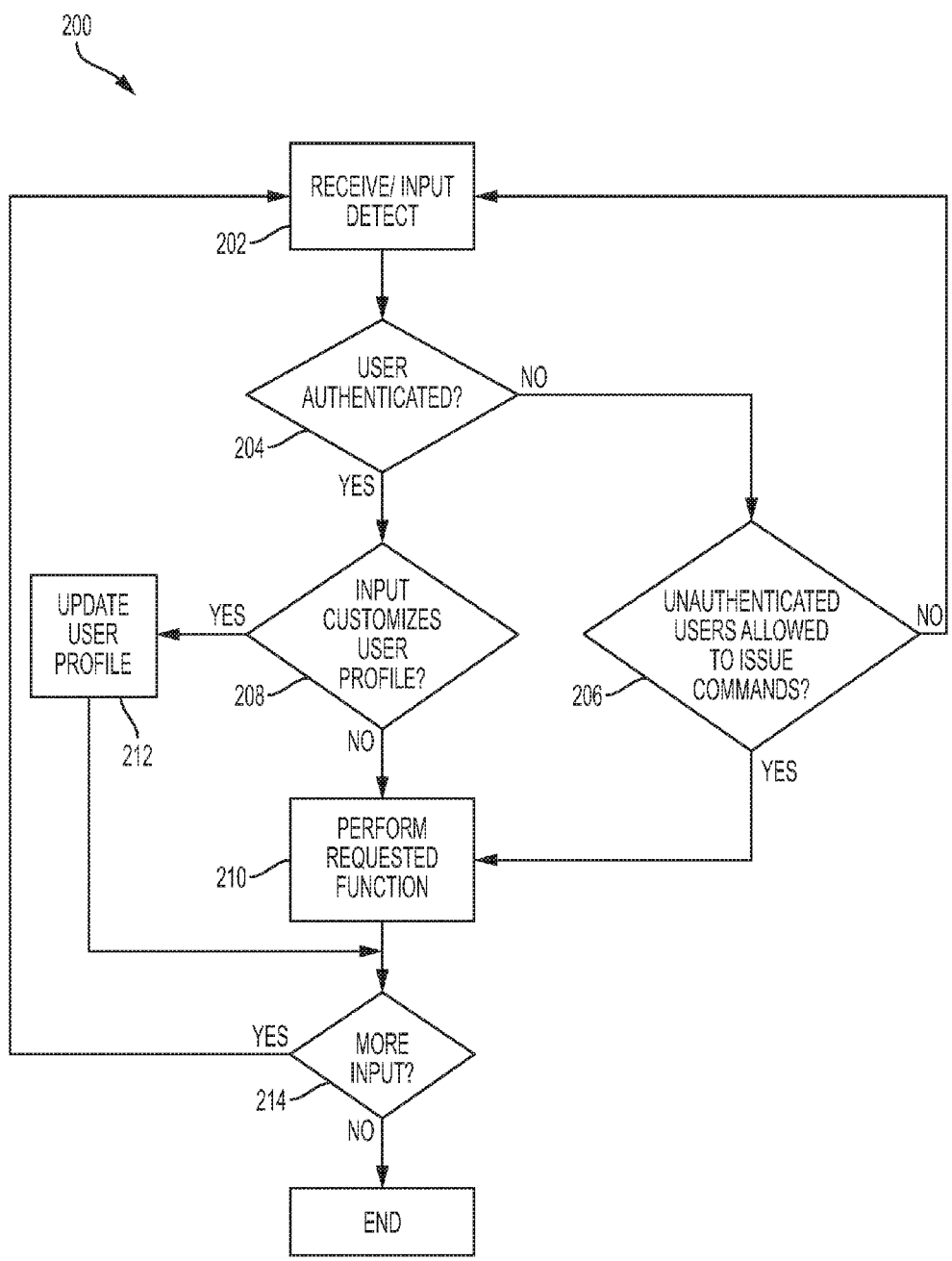
FIG. 2 is a flow chart of a process depicting user authentication, input detection, and hands-free appliance operation, according to one or more embodiments shown and described herein.

Turning now to FIG. 2, a flowchart 200 for user authentication and hands-free appliance control is depicted, through which embodiments of the disclosure can be implemented. At 202, the appliance detects and/or receives input from a user. The input may be any suitable type of audio or motion detected from a user. Examples of user-produced audio include spoken word(s), singing, humming, whistling, grunting, groaning, shrieking, gargling, or any other suitable type of detectable sound produced by a user. Motion produced by a user may be any type of detectable movement, and may include any type of movement a user's limbs/digits (or partial limbs/digits, such as due to amputations or other health issues), head, torso, or any portion of the user's body capable of exhibiting detectable movement. Some embodiments also utilize motion detection for objects under direct control of the user, such as hand-held objects. Other embodiments may include motion detection of objects not directly in contact with the user, such as objects being thrown or juggled. In some embodiments, the appliance may provide feedback indicating a response to received input. Some embodiments provide for visual biometric authentication, such as through a retinal scan, a fingerprint scan, etc. Appliance feedback may include any suitable type of output through, for example, output devices/displays 104, which may be visual (such as a screen, etc.), audio (via a speaker, etc.) that may include spoken output, or any other suitable type of output. The appliance 100 may provide output/feedback to a user in various embodiments described herein.

At 202, the appliance receives and/or detects input from the user. In various embodiments, detection component 120 provides audio and/or motion detection. Detection component 120 may utilize input detected by input device 106, such as a microphone or motion-sensor, and analyze the input utilize processor 102. User input, as discussed above, may be either audio or motion detected from the user. In this example, a user provides a spoken phrase and/or an arm gesture.

At 204, the appliance attempts to authenticate the user. In this example, the user speaks a command or password. A user may be identified through voice analysis performed by the detection component 120. The user may also be identified based on a specific word or phrase, which may or may not involve authenticating based on the voice itself. Other embodiments utilize input in the form of motion and/or gestures. For example, a user may wave an arm or extend a hand, which may become uniquely associated with the user. In another embodiment, the appliance includes a visual detection device 120 such as a camera (motion, still, infrared, etc.) to visually authenticate the user. Any type of visual authentication may be utilized, such as iris scanning, fingerprint scanning, etc. The appliance stores users profiles in memory (108, 110, 116, etc.), remotely, such as in a network 114 (cloud-based storage, etc.) and/or on a remote device 118. In some embodiments, if the user was previously authenticated at the start of the current session (e.g., a series of interactions with a user within a time period that may or may not have a time limit, such as a session timeout), the user authentication at 204 may be skipped.

At 206, if a user cannot be authenticated (e.g., there is not profile associated with the user), in some embodiments the appliance denies access to the user, thereby returning to 202. This may be, for example, because the owner of the appliance is away and does not want anyone (such as a child) playing with the appliance and possibly creating harm. Some embodiments may allow basic functionality such as turning on a burner in a restricted-functionality mode and/or restrict other features such as using a timer. In some embodiments, certain profiles may have restricted access, such as a child's profile. If a user cannot be authenticated, the appliance may create an anonymized (i.e., an anonymous user) profile. In some embodiments, an anonymized profile may store any suitable data about the user, include usage statistics. If the appliance allows unauthenticated users to operate the appliance, then the appliance may perform requested functions at 210. Some embodiments also distinguish between multiple users, such as only accepting input from one user while ignoring inputs from other users (e.g., if there is a group of people gathered near the appliance 100).

Returning to 204, if the user is authenticated, then at 208 in this example the appliance checks to see whether the user input is directed towards updating the user's profile. Examples of user input to update their profile includes, for example, updating contact information and/or a listing of other people that the user has indicated are permitted to utilize the appliance. Other examples of updated profile information may include new authentication information (new phrase, new motion, etc.) or new commands (new voice commands, new motion commands, etc.). In some embodiments, an authenticated user may grant access to other users (authenticated or unauthenticated) indefinitely or for a fixed time duration. Other embodiments may grant such access for a session, which may last until the user affirmatively ends the session through input, or after a period of time (which may be customizable in some embodiments). If the input in this embodiment is directed towards updating the user profile, then the appliance updates the user profile at 212. Once the profile is updated, the appliance checks for more input at 214.

If the user input is not directed towards updating the user profile, the appliance proceeds to 210 to perform the requested function. In some embodiments, a function that cannot be performed (such as requesting an appliance such as a stove to freeze food) may result in feedback indicating that the function cannot be performed. Some user requests may result in confirmation from the appliance, such as the duration and temperature at which to cook food. Some input may then require further input, such as a request to cook food resulting in the appliance requesting more information such as the type of food, the food's current temperature, the food's weight, the food's desired cooking temperature, the duration of the cooking, etc. In some embodiments, as discussed above, the detection component 120 may weigh objects (such as food placed upon a stove) where the input device senses weight (such as with a scale). Food weight may be utilized to calculate various meal options for a user. Once the requested function is performed, the appliance checks for more input at 214. If more input is received/detected from the user, the appliance receives the input at 202.

Figure 3A:
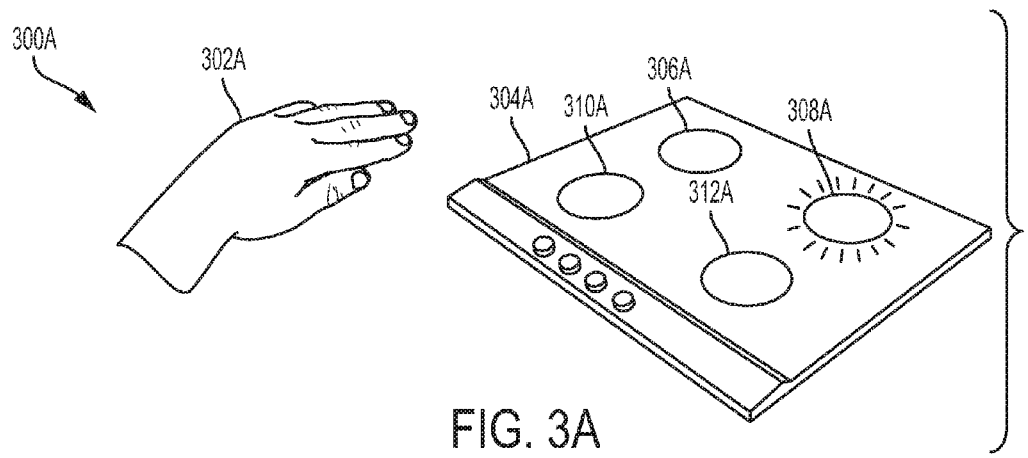
FIG. 3A schematically illustrates hands-free burner selection, according to one or more embodiments shown and described herein.

FIG. 3A is a depiction 300A of gesture-based selection of a burner 308A of appliance 304A, through which embodiments of the disclosure can be implemented. In this embodiment, a user may utilize a hand-gesture 302A to select a burner 308A, where the number of extended fingers corresponds to the desired burner (three fingers for burner number three for example). Any number of burners or any type of burner may be utilized herein for any example, including a mixture of different burner types for a single appliance. Continuing with this embodiment, selection of the burner may result in output from the appliance 304A indicating the burner 308A has been activated. Examples of such output may include indicator lights, verbal feedback, or a tone/music. Other burners 306A, 310A and 312A may be activated as well. Any type of gesture, movement, or audio input may be utilized to interact with burners in the embodiments depicted in FIGS. 3A-3C.

Figure 3B:
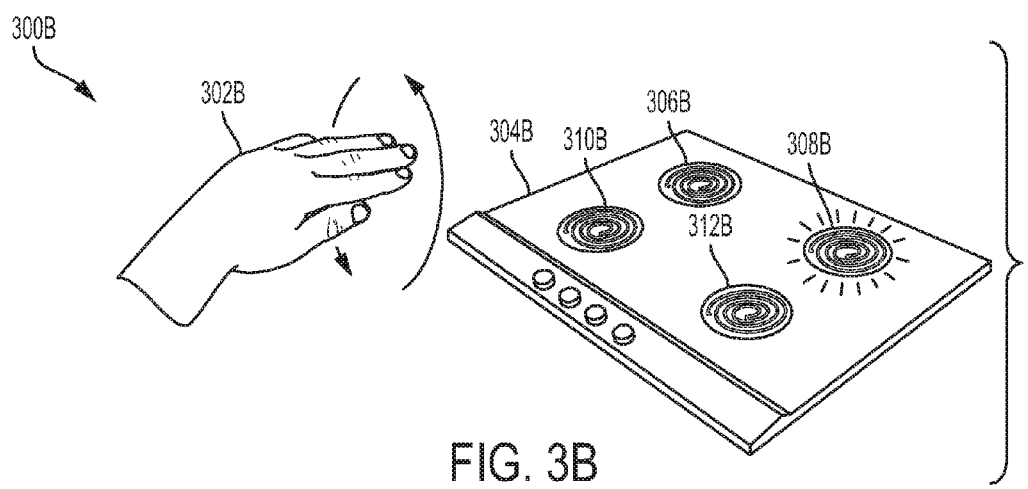
FIG. 3B schematically illustrates hands-free burner activation, according to one or more embodiments shown and described herein.

FIG. 3B is a depiction 300B of gesture-based activation of a burner 308B of appliance 304B, through which embodiments of the disclosure can be implemented. In this embodiment, a hand rotating gesture 302B turns on a burner 308B, where the burner was previously selected in FIG. 3A. Other embodiments may provide for immediate activation without first selecting a burner. Some embodiments may allow a generic gesture, such as no fingers needed (a general hand rotation) once the burner has already been selected (such as with three fingers).

Figure 3C:
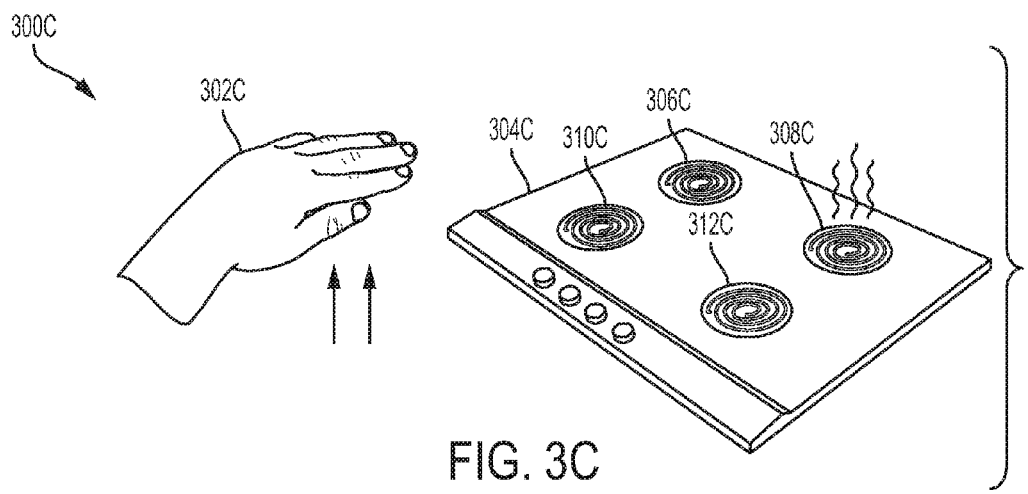
FIG. 3C schematically illustrates hands-free burner temperature modification, according to one or more embodiments shown and described herein.

FIG. 3C is a depiction 300C of gesture-based user heating of a burner 308C of appliance 304C, through which embodiments of the disclosure can be implemented. In this embodiment, a hand-raising gesture 302C raises the temperature of a burner 308C. Other embodiments may provide for a temperature increase without first selecting a burner, as three fingers in a hand-raising motion may immediately identify the burner as part of the gesture. Some embodiments may allow a generic gesture, such as no fingers needed (a general hand-raise) once the burner has already been selected (such as with three fingers). In some embodiments, the appliance 304C may provide visual feedback. For example, a display may show the desired/target temperature, which increases as the hand is raised higher and decreases as the hand is lowered. Some embodiments may provide spoken feedback in place of, or combined with, visual feedback.

Safety features, such as an immediate shut-off of a burner 308C, may be accomplished by built-in safety features via the safety component 122. The safety component 122 may provide, for example, automatic shutoff of one or all burners if a user waves both hands or utters a phrase such as 'help,' 'stop,' 'fire,' etc. The safety component 122 may also utilize, for example, an infrared camera 106 as a safety feature (either on the appliance 304C or located externally, such as on a remote device 118 as discussed in more detail below). The infrared camera may be utilized to detect smoke particles above a hot burner 308C and turn the burner off and/or alert the user.

Figure 4:
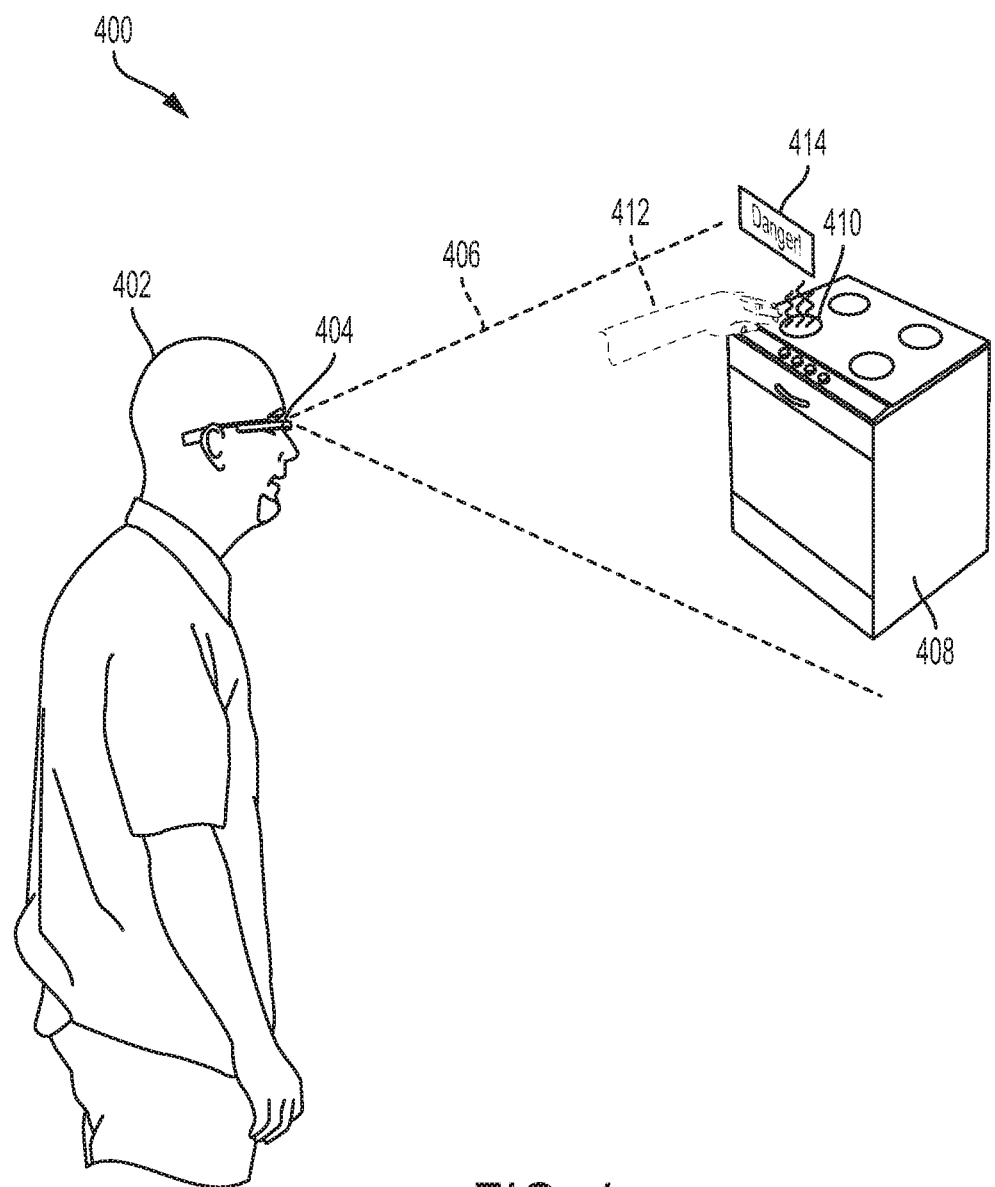
FIG. 4 schematically illustrates simulated appliance interaction via augmented reality headset, according to one or more embodiments shown and described herein.

Turning now to FIG. 4, a diagram of a user with an augmented-reality device with a view of an appliance is shown, through which embodiments of the disclosure can be implemented. In this embodiment, a user 402 is depicted wearing augmented-reality glasses 404, although any other type of augmented reality device may be used. The location and orientation of the user may taken into account so that the augmented content may be adapted if the user 402 moves around with the glasses 404. Within the field of vision 406 of the glasses 404, the user 402 sees an appliance 408 with a hot burner 410. Continuing with this embodiment, a virtual arm 412 is depicted in the glasses 404 that appears transparent, although the arm may appear solid or have any suitable type of appearance. The virtual arm 412 may correspond to the user's arm 412 movements, either fully or partially. Other embodiments may display the arm 412 in a manner that does not correspond to the user's movement in any way. The glasses 404 may have a data connection with the appliance 408, alerting the glasses to the fact that the burner 410 is hot. Other embodiments may have the glasses 404 detecting the heat from the burner 410 without any type of data connection, instead rely upon direct detection (visual, thermal, infrared, etc.). In this embodiment, the virtual arm 412 touches or overlays upon the real burner 410 that is hot, and provides a warning notification 414 stating "Danger!" in the glasses 404 to the user 402. Any type of notification may be utilized, including visual, audio, tactile (such as a vibration in the glasses), etc. For example, the virtual arm may virtually touch each burner, yet only provide a notification if a hot burner is touched. Other embodiments may provide simulated conditions related to the appliance, such as hot burners or fires, where no such conditions actually exist. Other embodiments provide that the glasses 404 update the augmented reality conditions based upon user input (audio command, gesture, etc.), data received from other sources (e.g., from over a network, etc.), or any other suitable source.

Some embodiments utilize other types of wearable electronics, such as fitness trackers, which are often worn on the wrist. A fitness tracker may be connected to the appliance 408, which may result in real-time or periodic data communications. Some embodiments provide for the appliance 408 to send an alert to the user when certain conditions are met, such as when a burner is hot or above a certain temperature. In this example, the notification may be defined by the appliance 408 and/or the user 402. In such embodiments, data relating to the user (such as calories burned within a period of time) can be utilized by the appliance 408 for personalized communications, such as food portion size, if the burner 410 has a scale to weigh food. Continuing with this scenario, the appliance 408 and/or the glasses 404 (if available) may communicate with the user 402, such as with a personalized message 414 in the glasses 404, based upon the fitness tracker data. In various embodiments, operation of the appliance 408 may be modified by the appliance's observation of the user 402. Some embodiments modify operation of the appliance 408 based upon monitoring data from a fitness tracker and data detected by the appliance 408.

In some embodiments, wearable devices may be utilized to detect a user's motion. For example, a device worn on the user's wrist may used to detect movements that can then be used to control the appliance 408. In other examples, a device worn on one or more of a user's fingers may be used to detect movement/gestures made with a user's arm, hand, and/or finger(s). In examples where a user utilizes a wearable device, detected user motion can be transmitted to the appliance 408, either directly or to any number of intermediate devices (servers, other appliances, etc.). In such examples, the appliance 408 need not have and/or utilize its own detection component 120, as the wearable device may serve as a detection component. Other examples may have the appliance 408 utilizing input from one or more wearable devices even where the appliance 408 has a detection component 120. In such examples, the appliance 408 may use motion detection from its own detection component 120, one or more wearable devices, or any combination thereof.

Some embodiments utilize neural networks (i.e., machine learning), which may be distributed over one or more networks 114 and/or with one or more remote devices 118. For example, data relating to cooking food on a burner 410 can be gathered from any number of users and, based upon the aggregated data, provide useful data to the appliance 408 and/or user 402, which can be utilized for improved energy efficiency, improved cooking experiences, etc. Updating of appliance 408 operations based on a neural network may be an iterative process, where the appliance 408 sends updated data to the network and receives further data to further modify its operations. Some embodiments provide for more complete control over the appliance 408 from the glasses 404, such as power options, profile management, setting rules/restrictions, timers, etc. For example, a rule could be set to restrict authenticated users that are less than ten years of age with respect to cooking duration, temperature, or number of burners usable at one time.

FIG. 5 depicts a diagram 500 of a user 510 utilizing augmented-reality on a handheld device to simulate conditions with an appliance 502, through which embodiments of the disclosure can be implemented. In this embodiment, the appliance 502 has an unheated burner 504 underneath an unheated pan 506 which contains uncooked food 508. The user 510 holds a smartphone 512, which displays onscreen 514 an augmented reality version of the appliance 516. On the screen 514 the burner 504 is depicted as a simulated hot burner 518, along with a simulated hot pan 520 and cooking food 522 accompanied by simulated heat 524 arising. The smartphone 512 may have a data connection with the appliance 502, and in some embodiments the smartphone 512 can update the augmented reality display to adapt to changing conditions of the appliance 502. Other embodiments may provide that the smartphone 512 updates the augmented reality conditions based upon user input (audio command, gesture, etc.), data received from other sources (e.g., from over a network, etc.), or any other suitable source. Some embodiments provide for more complete control over the appliance 502 from the smartphone 512, such as power options, profile management, setting rules/restrictions, timers, etc. Some embodiments provide for recommendations provided to the user 510 from the appliance 502, smartphone 512, augmented reality glasses 404, etc., relating to data specific the user 510 and/or their profile, equipment they are utilizing (glasses 404, fitness tracker, etc.), and/or appliance 502. Some embodiments utilize food profiles, which contain motion gestures and/or spoken words identified with the food item, information relating to specific foods, such as allergens, calories, cooking times, indicating combinations with other foods for recipes, all of which may be utilized as data by the user's smartphone 512, glasses 404, and/or appliance 502.

In some embodiments, a user 510 may input any number of criteria to further enhance the augmented reality experience. The user may provide such input on the appliance 502, or on a separate device 512, which may be handheld, head-mounted 404, or be any other type of device (laptop, desktop, etc.). The user-specified data may be utilized to overlay other types of data, in addition to the exemplary overlain data described above (such as 412, 522, and 524). Such user-specified overlay data may be output directly as an overlay, or may be utilized in other ways. For example, a user 510 may desire to cook an item, such as sautéed onions. The user 510 may select from among a variety of cooking options (such as sautéed, fried, etc.), where each cooking option may provide a cooking time, and which may also incorporate additional user input such as the weight, type, and/or quantity of onions being sautéed. In another example, the user 510 may provide data, such as a specific amount of time that the onions should be cooked, which may be input by the user (spoken, gestured, and/or provided by finger-based input) to reach a desired outcome (such as sautéed onions). The user's device 512 may provide notification (visual, audio, vibration, etc.) to the user 510 that an event has occurred, is occurring, or will occur (cooking time reached, time to flip, etc.). In this example, the user 510 and/or the user's device 512 may turn away from the onions currently cooking. In some examples a notification may occur when, after having left the display 514, the sautéing onions then return to view on the display 514 (such as when the user's device pans back around). The notification may display, for example, when the sautéed onions are ready, the amount of cooking time remaining only when the onions appear on the display 514, when the onions are actually in view (such as via a camera associated with the user's device), etc. Some examples may allow the user 510 to modify their input (such as cooking type, ingredients), or the input of another user, at any time or during intervals (defined by a user, automatically defined, associated with the food type, etc.).

In multiple embodiments, data regarding food preparation may be communicated between an appliance 502 and remote devices 118 such as augmented reality glasses 404, smartphones 512, and refrigerators (not shown). For example, a smart refrigerator that keeps track of what types of food are in the refrigerator and/or how long each item has been in the refrigerator may communicate various recipes to the appliance 502 based upon the contents that are in the refrigerator and/or what types of food the user 510 may buy (whether such data is input by the user 510 or inferred from data usage pattern derived from the user's history and/or the histories of multiple users over a neural network). The appliance 502 may, based on data from a refrigerator, alert the user 510 that the last of a food type is being used and more should be purchased, and/or which food in the refrigerator is currently edible.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for hands-free use of an appliance, comprising:
    detecting input from a hands-free user, the detected input being voice or gesticular;
    comparing the detected input to known inputs;
    retrieving a profile of the user based on the detected input corresponding to a known input;
    based upon retrieval of the user's profile, outputting recognition of the user input and modifying operation of a burner according to both the user input and the retrieved user profile;
    based upon the detected input being unrecognized, creating a new user profile associated with the detected input and modifying operation of a burner according to the detected input;
    selecting a burner from among a plurality of burners based upon a detected number of extended fingers from the user;
    modifying burner temperature based upon detecting a hand-lowering or hand-raising gesture from the user; and
    activating or deactivating a burner based upon a detected hand rotation from the user.

2. The method of claim 1 further comprising overlaying, on a device controlled by the user, augmented-reality content specific to (i) the appliance, (ii) a current operating condition of the appliance, (iii) the user, and (iv) a location and orientation of the user relative to the appliance.

3. The method of claim 1 further comprising:
    receiving at the appliance, from a monitoring device worn by the user, monitoring data specific to the user;
    modifying operation of the appliance based upon both the monitoring data and data detected by the appliance; and
    providing output to the user indicating the modified operation of the appliance.

4. The method of claim 1 further comprising:
    aggregating data based upon inputs received from a plurality of users;
    modifying operation of the appliance based upon the aggregated data;
    aggregating new data received in response to the modified operation of the appliance; and
    further modifying operation of the appliance based upon the new data.

5. The method of claim 1 further comprising:
    receiving storage data from a food storage device regarding edible contents of the food storage device; and
    providing output to the user based upon the storage data.

6. The method of claim 1 further comprising:
    obtaining weight data of food on the burner;
    outputting a plurality of options based upon a plurality of calculations and the weight data;
    receiving a response from the user indicating a choice of one of the plurality of options.

7. The method of claim 1 further comprising:
    notifying the user that the burner is above a threshold temperature; and
    turning off the burner in response to a two-handed gesture.

8. The method of claim 1 further comprising:
    creating an anonymized profile for a user; and
    subsequently recognizing the user and updating the anonymized profile though continued interaction.

9. An appliance providing hands-free operation, comprising:
    a burner;
    memory and a processor coupled to the memory;
    a detection component configured to:
        detect input from a hands-free user, the detected input being voice or gesticular;
        retrieve a profile of the user based on the detected input corresponding to a known input;
        based upon retrieval of the user's profile, output recognition of the user input and modifying operation of a burner according to both the user input and the retrieved user profile;
        based upon the detected input being unrecognized, create a new user profile associated with the detected input and modifying operation of a burner according to the detected input;
        select a burner from among a plurality of burners based upon a detected number of extended fingers from the user;
        modify burner temperature based upon detecting a hand-lowering or hand-raising gesture from the user; and
        activate or deactivate a burner based upon a detected hand rotation from the user; and
    a safety component configured to:
        notify the user that the burner is above a threshold temperature; and
        turn off the burner in response to a two-handed gesture.

10. The appliance of claim 9 further comprising a display device configured to provide visual output in response to the detected input.

11. The appliance of claim 9 further comprising a safety component configured to:
    receive notification from a client device that an infrared sensor on the client device has detected smoke particles above the burner; and
    turn off the burner in response to the received notification from the client device.

12. The appliance of claim 9 further comprising a communication component configured to modify operation of the burner based upon data received from an augmented reality device being used by the user, wherein the received data is based upon input provided by the user to the augmented reality device.

13. The appliance of claim 9 wherein a communication module is configured to:
    aggregate data based upon inputs received from at least one user;
    send the aggregated data to a remote device;
    receive, from the remote device, usage data corresponding to other users; and
    modify operation of the appliance based upon the received data.

14. The appliance of claim 9 wherein the detection component is further configured to identify a user or a gesticular command based upon detecting movement of a limb comprising less than five digits.

15. The appliance of claim 9 wherein the detection component is further configured to:
  create an anonymized profile for a user; and
  subsequently recognize the user and update the anonymized profile though continued interaction.

16. A non-transitory computer readable medium embodying computer-executable instructions, that when executed by a processor, cause the processor to:
  detect input from a hands-free user, the detected input being voice or gesticular;
  compare the detected input to known inputs;
  retrieve a profile of the user based on the detected input corresponding to a known input;
  based upon retrieval of the user's profile, output recognition of the user input and modifying operation of a burner according to both the user input and the retrieved user profile;
  based upon the detected input being unrecognized, create a new user profile associated with the detected input and modifying operation of a burner according to the detected input;
  upon receiving input from the user and other individuals, only respond to input from the user, unless the input is a specific two-handed gesture by any individual; and
  turn off the burner in response to the specific two-handed gesture by any individual.

17. The non-transitory computer readable medium of claim 16, further comprising instructions that cause the processor to visually identify the user.

18. The non-transitory computer readable medium of claim 16, further comprising instructions that cause the processor to:
  receive user-specified overlay data at a wearable user device, the user-specified overlay data being associated with the user's profile;
  transmit cooking instruction data to the user device, the cooking instruction data pertaining to an appliance within a field of vision of the wearable user device; and
  generate an augmented reality display on the user device utilizing the user-specified data, the transmitted data, a camera, and a display.

19. The non-transitory computer readable medium of claim 16, further comprising instructions that cause the processor to:
  create an anonymized profile for a user; and
  subsequently recognize the user and update the anonymized profile though continued interaction.

20. The non-transitory computer readable medium of claim 16, further comprising instructions that cause the processor to:
  notify the user that the burner is above a threshold temperature; and
  turn off the burner in response to a two-handed gesture.

* * * * *